Feb. 14, 1939. T. J. SMULSKI 2,147,113
WINDSHIELD WIPER
Filed Nov. 15, 1933
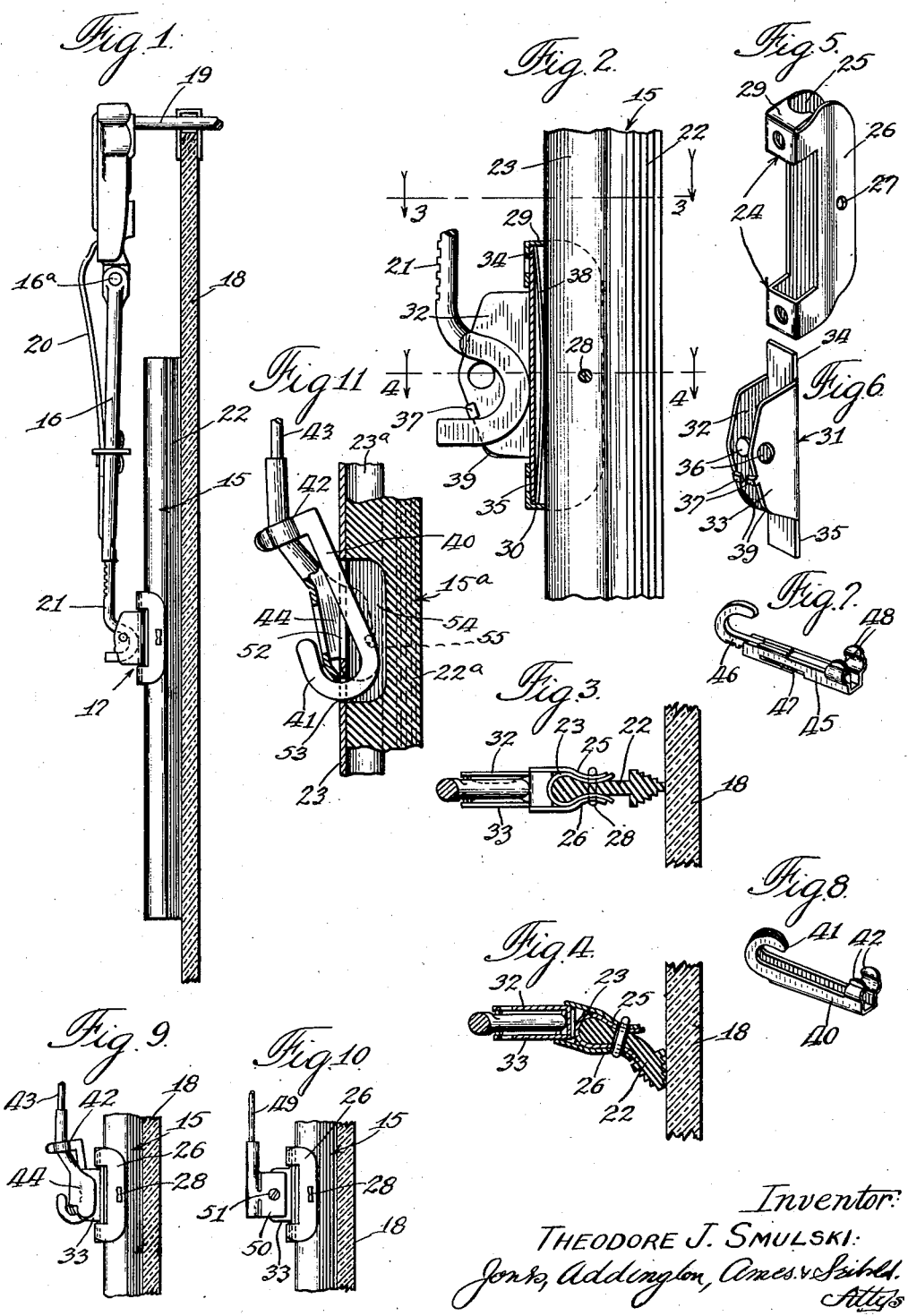
Inventor:
THEODORE J. SMULSKI:

UNITED STATES PATENT OFFICE 2,147,113

WINDSHIELD WIPER

Theodore J. Smulski, Gary, Ind., assignor, by mesne assignments, to The Anderson Company, Gary, Ind., a corporation of Indiana Application November 15, 1933, Serial No. 698,152

12 Claims. (Cl. 15—250)

This invention relates to windshield wipers and has special reference to a means for connecting the wiper blade of a windshield wiper to the actuating arm therefor, by which latter the blade is operated over the surface of a windshield to be cleaned.

More particularly, this invention relates to a connector between the wiper blade of a windshield wiper and the actuating arm therefor, which connector comprises essentially a member extending longitudinally of the blade for engagement therewith having a portion spaced from the blade and another member secured to the actuating arm and having a hinged connection with the blade connected member.

In order to eliminate chattering in a connection of the type above described, it is essential that the assembly be tight-fitting and yet provide a free movement with respect to a change in the angularity of the wiper blade with respect to the surface of the windshield at each end of the wiping stroke when the direction of movement of the blade is reversed. Heretofore, in so far as applicant is aware, such connection assemblies were not positive in character and depended more or less upon the functioning of tensioning members to obtain tight fits. In the present construction, the various elements of the assembled connecting means are positively held in a fixed relation and in this manner substantially eliminate chattering, which latter is objectionable since the surface of the windshield to be cleaned is only partially cleaned and vision is materially affected.

The member of the connection in engagement with the blade preferably comprises a body portion having arms extending therefrom for straddling the bead or enlarged head portion of the blade and for engaging the neck portion to prevent movement in one lateral direction, there being ears preferably formed integrally with the body portion and extending therefrom to engage the edge of the bead to prevent movement in the other lateral direction and to provide a spaced relation between the edge of the bead and the body portion. Therefore, a fixed spaced relation between the blade and the body portion is positively maintained.

The member for engagement with the actuating arm preferably comprises a body portion having arms extending therefrom, the ends of the body portion extending longitudinally beyond the arms being positioned in the space between the blade and the body portion engaging therewith and the ears of the body portion limiting the endwise movement of the member in engagement with the actuating arm. The ears, therefore, serve the double function of spacing the member in engagement with the blade so as to maintain a fixed lateral relation therebetween and in maintaining a fixed longitudinal relation between the actuating arm engaging member and the blade engaging member.

A resilient means is provided between the blade and the body portion of the actuating arm engaging member to normally maintain a substantial transverse alignment between the two members forming the connector between the blade and the actuating arm, but to permit an oscillation therebetween to obtain an angular position of the wiper blade with the surface to be wiped when the direction of movement of the blade is reversed. This resilient member is the only non-positive element in the connection assembly, all of the other elements being locked in fixed positions to eliminate play in the assembly and thereby to avoid chattering.

Inasmuch as wiper blades oftentimes must be replaced in windshield wiper constructions owing to the deterioration of the rubber material of the construction and other like causes, and, further, that the actuating arm will ordinarily outlast the life of the car upon which the windshield wiper is mounted, it is desirable that the connections between the wiper blade and the actuating arm be adapted to be universally associated with different types of actuating arms. Thus, for example, a wiper blade manufactured by one company should be capable of alternate use with various types of actuating arms manufactured by other companies. There are several types of actuating arms now on the market and this invention contemplates the provision of a connection for use between wiper blades and actuating arms of various types now prominent on the market. Such a construction may comprise a clamping member having spaced resilient arms for detachable engagement with an actuating arm and a hook member either formed integrally with the clamping member or adjustable longitudinally thereof for engagement with a bight portion on the wiper blade or on one of the members of a connector assembly for a wiper blade.

One of the objects of this invention is to provide a connection between a wiper and an actuating arm of the type above described in which the connection assembly permits a free movement with respect to the angular position of the wiper of the surface to be wiped, yet affords a rigidity of construction to prevent chattering of the blade on the surface to be cleaned.

Another object of this invention is to provide a connection between a wiper blade and an actuating arm therefor of the type above pointed out, in which the connection permits of the employment of a blade for use in association with actuating arms of alternate types.

Other objects and advantages will be hereinafter more particularly pointed out and for a more complete understanding of the characteristic features of this invention reference may now be had to the following description when taken together with the accompanying drawing, in which latter:

Figure 1 is an elevational view of a windshield wiper blade and an actuating arm therefor showing its application to the windshield of a motor vehicle or the like, and illustrating an embodiment of the connection of the present invention;

Fig. 2 is an enlarged fragmentary side elevational view of the actuating arm and wiper blade showing the connector therebetween in section;

Fig. 3 is a plan sectional view taken on the line 3—3 of Fig. 2;

Fig. 4 is a plan sectional view taken on the line 4—4 of Fig. 2 showing a changed position of the blade and one of the connector elements;

Fig. 5 is an enlarged perspective view of one of the connector elements;

Fig. 6 is a view similar to Fig. 5 of another of the connector elements;

Fig. 7 is an enlarged perspective view of a clamp member forming an element of the connector as employed in connection with one type of actuating arm;

Fig. 8 is a view similar to Fig. 7 showing another embodiment of the clamp member;

Fig. 9 is a fragmentary side elevational view of the connection embodied in this invention employed in connection with one type of actuating arm;

Fig. 10 is a view similar to Fig. 9 showing the connection as employed for use in connection with another type of actuating arm; and Fig. 11 is a view similar to Fig. 2 showing the clamp member of Fig. 8 in direct association between an actuating arm and a wiper blade.

Referring now to the drawing, and more particularly to Figs. 1 to 6, inclusive, thereof, the device of this invention comprises a wiper blade 15 connected to an actuating arm 16 through a connector 17, the blade and arm assembly being shown in an operative position with respect to a windshield 18 of a motor vehicle or the like. The upper end of the actuating arm 16 is mounted preferably on a rocker shaft 19 extending to be operated by a suitable mechanism ordinarily electrically or pneumatically actuated. It is to be understood, of course, that the actuating arm may be mounted for horizontal movement as well as for rocking movement.

The rocking movement of the shaft 19 is transmitted to the wiper blade 15 through the actuating arm 16 in a manner preferably to move the wiper blade arcuately across the surface of the windshield 18. In the illustration shown more particularly in Figure 1, a preferred type of actuating arm 16 is shown in which the lower end of the arm is hingedly supported as at 16a and has adjustable pressure on the blade by means of the spring 20, the tension of which latter may be readily adjusted. The arm below the pivotal point is formed of two members telescopically arranged for adjustment of the length of the lower hook-shaped portion 21 so that the wiping action may take place on the windshield where desired. Further the spring pressure is so constructed and arranged that the blade may be positioned away from the windshield for cleaning the windshield and preventing damage to the blade when wiping the glass by manual manipulation.

The wiper blade 15 preferably comprises a wiping element 22 formed of flexible material such as rubber or the like, the element being mounted in a holder 23 preferably formed of metal or other suitable material. In the present instance, the holder is in the form of an enlarged head extending from a reduced neck portion when viewed in cross section, the head and neck portions being preferably arcuate and conforming to the shape and size of the engaged portion of the flexible member forming the wiping element 22.

Referring now more particularly to Fig. 5 of the drawing, a member of the connector is shown for engagement with the blade, the member comprising a body portion 24 having arms 25 and 26 extending therefrom for straddling the enlarged head portion of the holder 23 and for engaging the neck portion thereof. These arms 25 and 26 are provided with apertures 27 for registration with apertures in the holder and wiper elements to receive a bolt or cotter pin 28. The arms 25 and 26 being held against the reduced neck portion by the cotter pin 28, prevent movement of the connector in one lateral direction from the wiper. Ears 29 and 30 preferably formed integrally with the body portion 24 of the connector element extend therefrom toward the wiper for engagement with the outer edge therof to hold the connector against movement in the other lateral direction toward the wiper element. Thus, the connector shown in Fig. 5 is held against longitudinal movement of the blade by the cotter pin 28 and against lateral movement in one direction by the ears 29 and 30 and in the other direction by the ears 25 and 26. Means are, therefore, provided for maintaining a fixed spaced relation between the edge of the blade and the main body portion 24 of the connector member.

The other element of the connector, which we will hereinafter call a hanger member, is shown more particularly in Fig. 6 and comprises a main body portion 31 having spaced arms 32 and 33 extending therefrom. Ends 34 and 35 extend longitudinally beyond the arms 32 and 33 from the main body portion 31 and are received in the space between the wiper element 23 and the main body portion 24 of the blade connector element. The arms 32 and 33 project through the opening provided in the main body portion 24 of the blade connector element and are provided with registering apertures 36 and a bight portion formed by ears 37 extending in a direction toward each other and preferably formed integrally with the arms.

Referring now more particularly to Fig. 2 of the drawing, it will be noted that the ears 29 and 30 not only act to space positively the main body portion of the blade connector element from the edge of the blade but also act to prevent endwise movement of the hanger since the ends 34 and 35 thereof are such a length as to fit loosely therebetween. The arms 32 and 33 are sufficiently narrower than the opening provided in the body portion of the connector as to prevent any frictional engagement therebetween. The hanger member is held in a position against the main body portion by means of a resilient member 38, which latter is shown in the form of a leaf spring.

The construction thus described permits the hanger and the connector to normally maintain substantial transverse alignment, as shown in Fig. 3, and also permits an oscillation therebetween, as shown more particularly in Fig. 4, to obtain an angular position of said wiper blade with the surface to be wiped, the construction permitting a change in the direction of movement when the blade is reversed to eliminate chattering.

The connector is held positively against movement in either transverse direction of the wiper blade as also longitudinally thereof. The hanger member is likewise held positively against longitudinal movement of the wiper blade by reason of the ears 29 and 30, although the hanger is permitted a free movement to oscillate to obtain the angular position necessary for contact with the glass by reason of the spring member 38. It is to be noted that the correct angular position of contact depends substantially upon the correct spacing provided by the ears 29 and 30 and such spacing must be accurate to from three to five one-thousandths of an inch. Accuracy cannot be obtained, of course, where any latitude of play exists and inaccuracy results in an improper angularity of contact between the wiper blade and the windshield and consequent improper wiping or cleaning action.

In the present embodiment illustrated in Figs. 1 to 6, inclusive, the actuating arm is of a hook-shaped type and the arms 32 and 33 of the hanger are provided with inwardly offset portions 39 positioned below the bight portion 37 to provide an opening sufficient to receive the hook-shaped end of the actuating arm to prevent displacement of the hanger relatively to the arm. The end of the actuating arm being in the form of a hook and being received between the arms 32 and 33 of the hanger secure the hanger against oscillatory movement with respect to the actuating arm 16.

Inasmuch as all actuating arms are not of the hook-shaped type and since wiper blades are usually replaced, perhaps several times before the car has completed its service, it is highly desirable to maintain a supply of wiper blades for use with various types of actuating arms and the present invention contemplates the provision of an element in the connector assembly whereby the connector may be adapted for alternate use with different types of actuating arms. Referring now more particularly to Figs. 7, 8 and 9, a clamp member is shown engaged between an actuating arm of one type and the hanger of the assembly just described. The clamp member may preferably comprise, as shown in Fig. 8, a sheet metal stamping formed of a single piece into a substantially U-shaped body portion 40, one end of the body portion being hook-shaped as at 41 and the other end having a pair of ears 42 extending therefrom. The ears 42 are spaced and preferably arcuate to straddle and frictionally engage the lower end of an actuating arm 43. The lower end of the actuating arm 43 is of substantial U-shape to fit over or straddle the arms 32 and 33 of the hanger. The hook-shaped end 41 is inserted between the bight 37 and the inwardly offset portions 39 of the arms and the frictional arms 42 are clamped about the arm 43, as shown.

The flat faces of the U-shaped body portion 44 prevent oscillation of the hanger with respect to the arm and the assembly operates in all manners substantially as in the embodiment above described.

It may be desirable to have an adjustable clamp in place of the one piece construction just above recited and referring now more particularly to Fig. 7, such a clamp is shown as formed of a stamped sheet metal body portion 45 of a substantial U-shape to receive the straight end of a hook-shaped member 46. A portion 47 of the body portion 45 may be serrated and deformed in the manner shown in Fig. 7, the inturned edge of the portion 47 engaging a ratcheted surface of the hook member 46. The end of the body portion 45 opposite to the hooked member 46 is provided with resilient arms 48 of a preferably arcuate shape for frictionally engaging the actuating arm 43 and the assembly may be substituted for that above previously described, the hook-shaped end 46 fitting between the arms 32 and 33 of the hanger and extending through the space between the bight portion 37 and the inwardly offset portions 39.

Another common type of actuating arm is shown in Fig. 10 wherein the lower end 49 thereof is provided with spaced arms 50 for straddling the hanger, there being apertures in the arms for registering with the apertures 36 of the arms 32 and 33 of the hanger, a screw bolt, cotter pin 51 or other securing means being received in the registering apertures. The arms 50 provide a substantial contacting surface with the spaced arms 32 and 33 and prevent relative oscillatory movement therebetween and relative to the actuating arm 49.

It may be desirable in some instances to provide for a direct association of the actuating arm with the wiper blade and referring now to Fig. 11 of the drawing such a construction is shown. The actuating arm employed in this embodiment is that shown in Fig. 9. The wiper blade 15a is preferably provided with spaced apertures 52 and 53 in the metal holder element 23a and an elongated recess 54 in the resilient wiper element 22a registering with the apertures 52 and 53.

The flat spaced sides 44 of the U-shaped body portion on the lower end of the actuating arm 43 straddle the wiper blade and are connected thereto by means of the clamp member shown in Fig. 8, the ears 42 frictionally engaging the actuating arm 43 and the hook-shaped end portion extending through the aperture 52, the recess 54 and out through the aperture 53.

It is to be noted that the usual apertures 55 extend transversely through the holder and blade elements of the wiper and for this reason, the type of actuating arm shown in Fig. 10 may be employed in direct association therewith, the spaced arms 50 straddling the holder and having apertures for registration with apertures 55 and for receiving a bolt or cotter pin. Further, it will be noted that the hooked end portion 21 of the actuating arm shown in Fig. 1 may be inserted in the same manner as the hooked end portion 41 of the clamp.

While several embodiments of this invention are herein shown and described, it is to be understood that various modifications thereof may be apparent to those skilled in the art without departing from the spirit and scope of this invention and, therefore, the same are only to be limited by the scope of the prior art and the appended claims.

I claim:

1. A device for connecting a windshield wiper blade to a wiper arm including a connector comprising a body portion having spaced arms extending therefrom for straddling a portion of the blade and for engaging therewith, ears on said body portion closing the ends between said arms, said ears being adapted to extend into engagement with the blade for maintaining a fixed spaced relation between the blade and said body portion, and a hanger comprising a body portion having arms extending therefrom, the ends of said hanger body portion being positioned in the space between the blade and said connector body portion for hinged connection therewith, said ears limiting the endwise movement of said hanger ends, and said hanger arms extending through an opening in said connector body portion, said hanger arms being adapted to be connected with a wiper arm.

2. A device for connecting a windshield wiper blade to a wiper arm including a connector comprising a body portion having spaced arms extending therefrom straddling a portion of the blade and engaging therewith, ears on said body portion closing the ends between said arms, said ears being adapted to extend into engagement with the blade for maintaining a fixed spaced relation between the blade and said body portion, a hanger comprising a body portion having arms extending therefrom, the ends of said hanger body portion being positioned in the space between the blade and said connector body portion for hinged connection therewith, said ears limiting the endwise movement of said hanger ends, and said hanger arms extending through an opening in said connector body portion, said hanger arms being adapted to be connected with a wiper arm, and resilient means between the blade and said hanger body portion to normally maintain substantial transverse alignment between said connector and said hanger but to permit oscillation therebetween to obtain an angular position of the wiper blade with a surface to be wiped.

3. A device for connecting a windshield wiper blade to a wiper arm including a connector comprising a clip having spaced arms for engaging the blade, ears closing the ends between said arms providing a fixed spaced relation between a portion of said clip and the blade, and a hanger having a body portion hingedly mounted in said clip and spaced arms extending through an opening in said clip, said arms having a bight portion spaced from said body portion for connection with the wiper arm.

4. In a windshield wiper, the combination with a wiper blade and an actuating arm therefor, of a connector joining said blade and said arm comprising a clip engaging said blade, a hanger hingedly mounted on said clip, said hanger comprising a main body portion with spaced arms extending therefrom, said arms having a bight portion spaced from said body portion, and a resilient clamp member for detachable frictional engagement with said actuating arm, said clamp member having a hooked end portion for engagement with said bight portion.

5. In a windshield wiper, the combination with a wiper blade and an actuating arm therefor, of a connector comprising a clip engaging said blade, a hanger hingedly mounted on said clip, and a clamp member comprising a body portion of a sheet material forming a hook at one end and having spaced arms at the other end, said spaced arms being resilient and straddling said actuating arm for detachable engagement therewith and said hook having engagement with said hanger.

6. In a windshield wiper, the combination with a wiper blade and an actuating arm therefor, of a connector comprising a clip engaging said blade, a hanger hingedly mounted on said clip, and a clamp member comprising a U-shaped body portion having spaced resilient arms for detachable engagement with said actuating arm, said body portion receiving a hook member in a longitudinally adjustable engagement therewith for engagement with said hanger.

7. A connector for joining a wiper blade and an actuating arm of a windshield wiper, comprising a substantially rigid body portion having a hooked end portion for detachable engagement with said wiper blade, and a resilient clamp portion at the other end of said body portion for frictionally engaging said actuating arm to prevent accidental displacement of said connector and for detachable engagement therewith.

8. A connector for joining a wiper blade and an actuating arm of a windshield wiper, comprising a substantially rigid body portion having a hooked end portion for detachable engagement with a wiper blade, and a clamp portion at the other end of said body portion comprising spaced resilient arms for frictionally straddling said actuating arm to prevent accidental displacement of said connector and for detachable engagement therewith.

9. A connector for joining a wiper blade and an actuating arm of a windshield wiper, comprising a substantially rigid body portion formed of a single piece of sheet material, spaced arms formed integrally with said body portion for frictionally engaging said actuating arm to prevent accidental displacement of said connector, and a hooked end portion formed integrally with said body portion for detachably engaging said wiper blade.

10. A connector for joining a wiper blade and an actuating arm of a windshield wiper, comprising a substantially rigid body portion formed of a single piece of sheet material, spaced arms formed integrally with said body portion for frictionally engaging said actuating arm, and a hooked end portion longitudinally adjustably connected to said body portion for detachably engaging said wiper blade.

11. A clip for securing a wiper element to a wiper arm, said clip having two elongated, spaced, parallel sides, each of said sides having a resilient extension at one end of the clip and projecting from a side edge thereof, said extensions being adjacent each other for yieldingly embracing a wiper arm, and each of said sides having means spaced from said extensions for engagement with a wiper blade.

12. A device for connecting a windshield wiper blade and support therefor to an arm adapted to actuate said blade, said device comprising a body having a portion adapted to engage said support, said body being provided adjacent one of its extremities with a substantially rigid projection for engaging one end portion of said arm and being provided adjacent another of its extremities with a pair of resilient projections for yieldingly engaging opposite sides of another portion of said arm to facilitate the connecting and disconnecting of the device and said actuating arm.

THEODORE J. SMULSKI.